US010500781B2

(12) United States Patent
Desoutter et al.

(10) Patent No.: US 10,500,781 B2
(45) Date of Patent: *Dec. 10, 2019

(54) METHOD FOR FORMING A CONTAINER FROM A PREFORM WHEREIN THE WALL OF THE PREFORM IS VIBRATED DURING SAID FORMING

(71) Applicant: DISCMA AG, Hunenberg (CH)

(72) Inventors: Luc Desoutter, Octeville-sur-Mer (FR); Guy Feuilloley, Octeville-sur-Mer (FR)

(73) Assignee: DISCMA AG, Zürich (CH)

( * ) Notice: Subject to any disclaimer, the term of this patent is extended or adjusted under 35 U.S.C. 154(b) by 37 days.

This patent is subject to a terminal disclaimer.

(21) Appl. No.: 15/739,508

(22) PCT Filed: Jun. 24, 2016

(86) PCT No.: PCT/EP2016/064733
§ 371 (c)(1),
(2) Date: Dec. 22, 2017

(87) PCT Pub. No.: WO2016/207388
PCT Pub. Date: Dec. 29, 2016

(65) Prior Publication Data
US 2018/0186055 A1    Jul. 5, 2018

(30) Foreign Application Priority Data
Jun. 25, 2015 (EP) .................... 15305993

(51) Int. Cl.
B29C 49/12    (2006.01)
B29C 49/46    (2006.01)
(Continued)

(52) U.S. Cl.
CPC .............. B29C 49/06 (2013.01); B29C 49/12 (2013.01); B29C 49/4273 (2013.01);
(Continued)

(58) Field of Classification Search
CPC .. B29C 49/46; B29C 2049/4664; B29C 49/12
See application file for complete search history.

(56) References Cited

U.S. PATENT DOCUMENTS 5,254,298 A     10/1993  Ibar
2014/0157726 A1  6/2014  Clussarath et al.
2018/0178437 A1* 6/2018  Desoutter ............... B29C 49/06

FOREIGN PATENT DOCUMENTS

CA    2277660 A1   1/2001
EP    2283991 A2   8/2010
(Continued)

Primary Examiner — Robert B Davis
(74) Attorney, Agent, or Firm — Eric J. Sosenko; Jonathan P. O'Brien; Honigman LLP

(57) ABSTRACT

A method using an injection device having an outlet through which a liquid is injected into a preform and includes the steps of placing a preform in a malleable state in fluidic communication with an outlet of the injection device, forming the container by expanding the preform during a forming step, the forming step including at least an injection step, wherein pressurized liquid is injected into the preform through the outlet of the injection device such that the liquid expends expands the preform into a container and fills the container. The method includes a step of heating the wall of the preform during at least a part of the forming step by vibrating the wall of the preform.

18 Claims, 6 Drawing Sheets

(51) Int. Cl.
*B29C 49/06* (2006.01)
*B29C 49/42* (2006.01)

(52) U.S. Cl.
CPC ...... *B29C 49/46* (2013.01); *B29C 2049/4664* (2013.01); *B29C 2049/4694* (2013.01); *B29C 2791/008* (2013.01)

(56) References Cited

FOREIGN PATENT DOCUMENTS

| | | |
|---|---|---|
| WO | 95/22447 | 8/1995 |
| WO | 98/26908 | 6/1998 |

* cited by examiner

METHOD FOR FORMING A CONTAINER FROM A PREFORM WHEREIN THE WALL OF THE PREFORM IS VIBRATED DURING SAID FORMING

TECHNICAL FIELD OF THE INVENTION

The present invention relates to a method for forming a container from a preform and filling said container with a liquid.

The invention also relates to a forming station for implementing said method and to an assembly comprising said forming station.

In the application, "liquid" has a physical meaning. It designates any incompressible and able to flow medium. The liquid can have a low viscosity (like water or alcohol), a medium viscosity (like edible oil or soup), or a high viscosity (liquid detergent, soap, shampoo, ketchup, mustard). The liquid can be homogeneous or not homogeneous (including fruit pulp or bits of foodstuff), it can be Newtonian or non-Newtonian. It is not limited to foodstuff. The incompressible liquid may be for example water, or other beverages, foodstuff such as ketchup, mayonnaise, edible oil, yogurts, home or personal care products, medical fluids, fuels, hydraulic oil, operating fluids, and the like.

BACKGROUND

In the field known as "hydroforming", it is known to use a pressurized liquid injected inside a preform placed in a mold to shape a container according to the shape of the mold and fill said shaped container with the liquid at the same time. Advantageously, the injected liquid is the end product contained in the container, i.e. the product which is intended to be provided to a consumer using the container.

For allowing the deformation of the preform into a container, the preform is heated at a temperature greater than the glass transition temperature and lower than the crystallization temperature of the material of the preform such that the preform is placed in a malleable state and is able to expand up to the shape of the container to be produced.

The liquid injected in the preform is generally injected at a temperature lower than the glass transition temperature. The temperature of the injected liquid is for example the ambient temperature, typically from 5° C. up to 50° C. while the glass transition temperature is for example over 75° C. for PET. Consequently, the liquid causes a rapid quenching of a very thin section of the inner walls of the preform during the injection of the liquid, generating a huge shear of temperature gradient with the outer wall of the preform.

Therefore, during the deformation of the preform while the container is not fully shaped, if the container is cooled down to a temperature under the glass transition temperature, the material of the container is no longer malleable and it is possible that the container can no longer be expanded up to the wanted shape or that the obtained container having a part deformed at a temperature below the glass transition temperature is not satisfactory in terms of mechanical and/or thermal resistance and/or in terms of gas permeability.

In order to solve this issue, the temperature of the preform can be increased such that the moment at which the temperature of the material of the container becomes inferior to the glass transition temperature is delayed in order for this moment to occur after the time needed to completely shape the container.

However, increasing the heating temperature of the preform close to the crystallization temperature has several drawbacks.

The heating of the preform at a high temperature releases the internal stress in the material of the preform which can cause an unwanted deformation of the preform prior to its shaping into a container. This deformation is for example a bending of the preform, known as the "banana effect" and/or a height variation of the preform. Such an unwanted deformation of the preform can lead to a malformation of the container which is susceptible of bursting inside the mold in which the container is produced. In this case, the liquid filling the container is spilled in the mold and in the machine for forming the containers and soils the machine. The machine than has to be stopped and cleaned and the destroyed container has to be removed from the machine. The throughput of the machine can therefore be greatly reduced. Furthermore, the heating of the preform at a higher temperature implies a greater energy consumption, which impairs the energy balance of the machine.

US-2014/157726 discloses a hydroforming method using a sensor unit, which can be arranged to vibrate the wall of the preform during the injection of liquid such that the characteristics of the vibrations are captured to determine if a container is leaking or if a burst of the container has occurred. This documents that vibrating the preform wall is not necessary if a very sensitive vibration sensor is used since in this case the natural vibrations of the wall of the preform can be captured.

WO-95/22447 discloses a mold unit comprising a vibrating wall arranged to vibrate the material of the container applied against the wall, meaning that the vibrations occur after the forming of the container, once the container is already shaped and in contact with the wall of the mold. The vibrations are arranged to improve the physical properties of the molded container.

However, these documents do not address to problem of the temperature of the wall of the preform during the forming step.

One of the aims of the invention is to solve the above-mentioned drawbacks by proposing a hydroforming method allowing the container to be properly shaped without requiring an overheating of the preform.

SUMMARY OF THE INVENTION

To this end, the invention relates to a method for forming a container from a preform and filling said container with a liquid using an injection device comprising an outlet through which said liquid is injected in said preform, the method comprising the steps of:

- placing a preform in a malleable state in fluidic communication with the outlet of the injection device,
- forming the container by expanding the preform during a forming step, said forming step comprising at least an injection step, wherein pressurized liquid is injected in the preform through the outlet of the injection device such that the liquid expends the preform into a container and fills said container,
- the method further comprising a step of heating the wall of the preform during at least a part of the forming step by vibrating said wall of the preform during said part of the forming step.

By vibrating the wall of the preform during a part of the forming step, additional energy is brought to the preform, the vibrational energy being converted into heat in the wall of the preform because the vibrations resonate with the molecular chains in the material of the preform, which results in internal frictions of the molecular chains causing a heating of the preforms. Consequently, the preform does not have to be overheated prior to the forming step, which reduces the energy consumption and the risks of bursting.

It should be noted that the vibrations disclosed in US-2014/157726 are not arranged to heat the wall of the preform during the forming step since these vibrations are not necessarily needed and are only arranged to be captured by a sensor unit and to be compared with expected target vibration characteristics but not to modify the temperature of the wall of the preform.

According to other features of the method according to the invention:
  the vibrations vibrating the wall of the preform during at least a part of the forming step are arranged to resonate with the internal molecular chains of the material of the preform;
  the wall of the preform is vibrated during at least a part of the injection step;
  the liquid flows from a source of pressurized liquid to the outlet of the injection device via a liquid injection circuit, the liquid flowing in the injection circuit being vibrated such that the vibrations of the liquid flowing in the liquid injection circuit, through the outlet and in the preform during the injection step are transmitted to the wall of the preform by said liquid.

The liquid injected in the preform is a very simple medium usable to transmit the vibrations to the wall of the preforms from the structure of the station for forming the container. The vibrations are applied to the inner wall of the preform, which is the wall that is rapidly cooled down by the liquid.

According to other features of the method according to the invention:
  the injection step comprises a low pressure injection phase wherein liquid is injected inside the preform at a first pressure until the preform acquires an intermediary shape and high pressure injection phase occurring after the low pressure injection phase wherein liquid is injected inside the preform having the intermediary shape at a second pressure until the preform acquires the final shape of the container to be formed, the second pressure being greater than the first pressure;
  the wall of the preform is vibrated during at least a part of the low pressure injection phase;
  the wall of the preform is vibrated during at least a part of the high pressure injection phase.

By vibrating the wall of the preform during the high pressure injection phase, energy is brought to the wall of the container when said energy is most needed. Indeed, the high pressure injection phase is performed to complete the shaping of the container at the end of the injection step when the container has already been cooled down during the low pressure injection phase. Consequently, bringing energy to the wall of the container allows compensating the cooling down of the container due to the low pressure injection phase. Furthermore, the high pressure phase takes place when the container is almost full of liquid at a lower flow rate than during the low injection phase. At this lower flow rate, the appearance of cavitation in the liquid is reduced which improves the propagation of the vibrations in the liquid and therefore the energy transfer to the wall of the container. The shaping of the container can therefore easily be completed during the high injection phase with the energy supply provided by vibrating the wall of the container.

According to other features of the method according to the invention:
  the low pressure injection phase occurs until the intermediary shape presents a volume corresponding to between 90% and 98% of the volume of the container to be shaped, the high pressure phase occurring such that the volume of the intermediary shape further increases by 2% to 10% of said volume of the container to be shaped in order to obtain the final shape of the container,
  the forming step comprises a stretching phase, wherein a stretch rod of the injection device is moved to expand the preform by exerting a force in an axial direction on the wall of the bottom of the preform, the wall of the preform being vibrated during at least a part of the stretching phase,
  the wall of the preform is vibrated by vibrating the stretch rod such that the vibrations of the stretch rod are transmitted to the wall of the preform during the stretching phase.

Using the stretch rod to vibrate the wall of the preform allows bringing energy to the wall of the preform before the beginning of the injection phase as soon as the stretch rod contacts the bottom of the preform. Furthermore, the stretch rod, which is a rigid solid rod, transmits the vibrating energy in an optimal manner. Consequently, energy is transmitted with little dissipation in the stretch rod.

According to other features of the method according to the invention:
  the preform is placed in a mold defining a molding cavity having the shape of the container to be formed, said mold being arranged to receive the preform such that the preform acquires the shape of the molding cavity when the forming fluid is injected in said preform, the vibrating of a part of the wall of the preform being stopped when said part of the wall of the preform comes into contact with the wall of the mold during the forming step,
  the frequency and/or the amplitude of the vibrations of the wall of the preform are tunable such that the wall of the preform can be vibrated at different frequencies or at different amplitudes during at least a part of the forming step.

The invention also relates to a forming station for forming a container from a preform by injecting a liquid in said preform according to a method as described above, said station comprising:
  a source of pressurized liquid,
  a injection device comprising an inlet, in fluidic communication with the source of pressurized liquid, and an outlet in fluidic communication with the inlet and through which the pressurized liquid is intended to be injected in the preform during an injection step,
  wherein the forming station further comprises at least one vibratory device arranged to emit vibrations, means for transmitting said vibrations to the wall of the preform and a control device arranged to actuate the vibratory device during at least a part of the forming step, said vibrations being arranged to heat the wall of the preform when the vibratory device is actuated.

The forming station allows implementing the above-described method.

According to other features of the forming station according to the invention:

said vibrations vibrating the wall (15) of the preform (2) during at least a part of the forming step are arranged to resonate with the internal molecular chains of the material of the preform;

the forming station comprises a liquid injection circuit extending between the source of pressurized liquid and the outlet, the vibratory device being connected to the liquid injection circuit, said vibratory device comprising a vibrating part extending in said liquid injection circuit such that said vibrating part is in contact with the liquid during the injection step, the control device being arranged to actuate the vibratory device during at least a part of the injection step;

the forming station further comprises a stretch rod movable in translation according to the axis of the stretch rod relative to the outlet and arranged to assist the axial deformation of the preform during at least a part the stretching phase, the vibratory device being mechanically coupled to and/or attached to the stretch rod and the control device being arranged to actuate the vibratory device during at least a part of the stretching phase.

The invention also relates to an assembly comprising an injection device of a forming station as previously defined, and a source of pressurized liquid formed by a source of cleaning liquid, and a cleaning liquid collecting container placed in fluidic communication with the outlet of the injection device of the forming station, wherein the control device is arranged to actuate the vibratory device during at least a part of a cleaning step wherein the cleaning liquid circulates in the injection device from the source of cleaning liquid to the cleaning liquid collecting container.

The forming station described above can be easily cleaned with the assistance of the vibratory device combined with the circulation of cleaning products in the forming station. Indeed, the vibratory device can be used to detach adhering materials from the wall of the liquid injection circuit by vibrating said wall while cleaning products flow against said wall.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
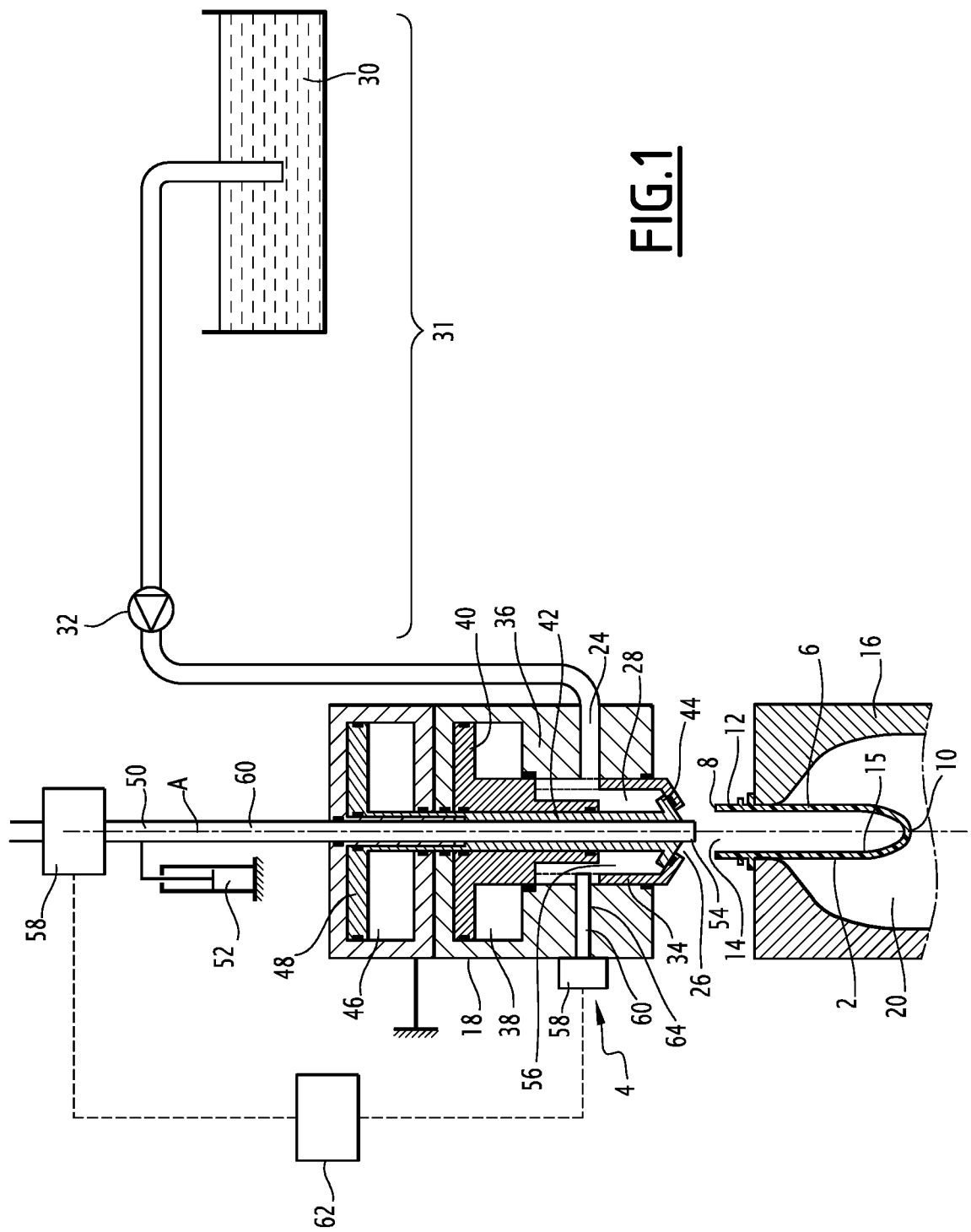
FIGS. 1 to 6 are diagrammatical cross-section views of part of a forming station carrying a preform at various steps of the forming step of the method according to the invention.

In the following description, the terms "upper" and "lower" are defined relative to axis A, which corresponds to the axis of the container to be produced and which extends substantially vertically when the container is placed on its bottom.

The invention relates to the technical field of forming containers 1, such as bottles, for example beverage bottles containing water, carbonated water, carbonated soft drinks, Juices, Teas, energy drinks, alcoholic, non-alcoholic drinks or other type of liquids, such as personal or home care products, pharmaceutical, viscous food and non-food products such as for example and not limited to edible oil, ketchup, yoghurts, motor oil.

More specifically, the invention relates to a method for producing a container 1 from a preform 2 in a forming machine comprising at least a forming and filling station 4.

The machine is arranged to receive successive preforms 2, each made of a thermoplastic material. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Figure 2:
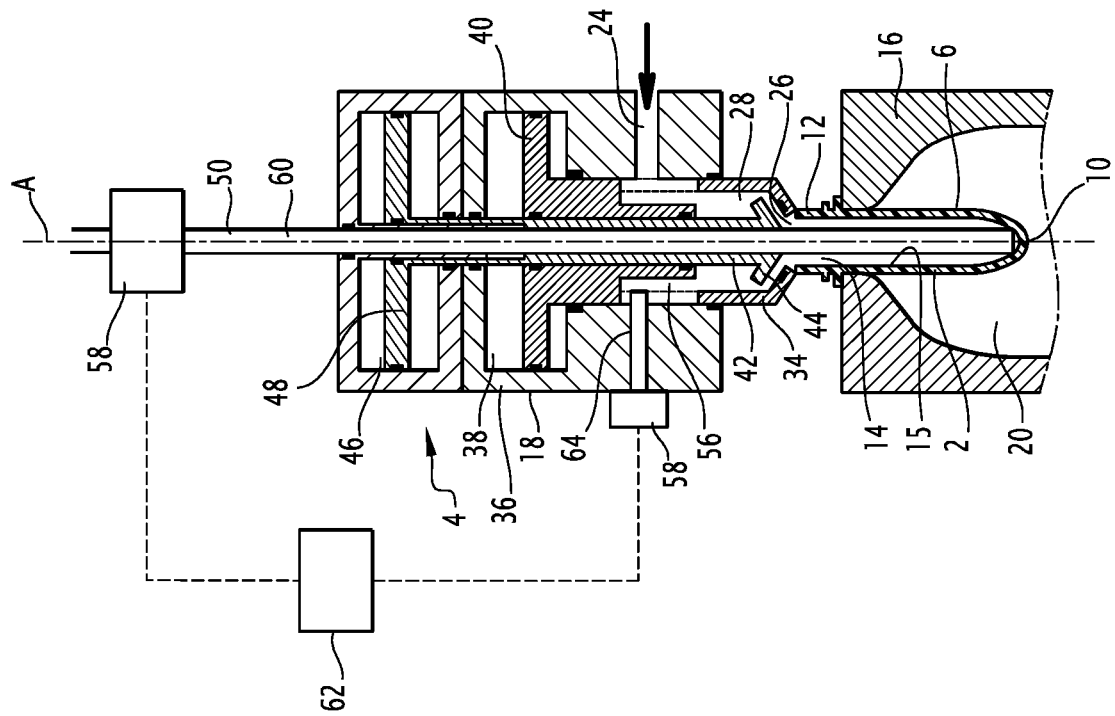

Each preform 2 has for example the general shape of a test tube. Consequently, each preform 2 comprises a body 6 having the shape of a tube extending along a longitudinal axis A and having a U shape in longitudinal cross-section, i.e. in an axial plane containing the longitudinal axis A, as shown in FIG. 2. The preforms 2 have an open extreme part 8 and, at the other end, a closed extreme part 10. The open extreme part 8 has for example the final shape of the neck 12 of the container to be shaped, meaning that the shape of the neck 12 will not be modified during the container forming process. The neck 12 defines an inner opening 14 extending along the longitudinal axis A and delimited by a wall with an external face for example provided with a thread allowing the container 1 to receive a cap by screwing. The closed extreme part 10 has for example a hemispherical shape. The above described shape is given as a non-restricting example and other shapes can be foreseen, for example another shape of the neck, without a thread, comprising or not an outer shoulder extending radially substantially perpendicular to the longitudinal axis A. The inner volume of the preform 2 is delimited by an inner wall 15 of the preform.

The preforms 2 can be produced at another location than the location of the forming machine, such that the preforms are stored and shipped together to the location of the machine.

The preforms are then successively loaded in the machine and transferred to a heating station. The heating station is conventional and will not be described in detail herein. The heating station is arranged to heat each of the successive preforms at a temperature comprised between the glass transition temperature and the crystallisation material of the thermoplastic material of the preform 2 such that the preforms 2 are placed in a malleable state in which they are able to be deformed under the influence of a pressure injected inside said heated preforms 2. Alternatively, the preforms 2 can be produced at the same location than the location of the forming machine such that the injected preforms are transferred to the inlet of the forming machine. This allows reducing the energy required for heating the preforms before the forming step.

Each heated preform 2 is then transferred, for example by means of a transfer wheel, to a forming and filling station 4.

The forming and filling station 4 is for example carried by a forming wheel rotating around a first axis substantially parallel to the longitudinal axis A. The forming and filling step, which will be described subsequently, can then be carried out during the rotation of the forming station 4, which allows forming and filling several preforms 2 at the same time by providing several forming stations 4 on the wheel.

Each forming and filling station 4 comprises a mold 16 arranged to receive a preform 2 and an injection device 18 arranged to inject a forming liquid in the preform 2 received by the mold 16, as shown in FIGS. 1 to 5. Apart from the vibratory device(s) and for the means for controlling said vibratory device(s), which will be described subsequently, such a forming and filling station 4 is conventional for a hydroforming machine.

The mold 16 defines a molding cavity 20 having the shape of the container 1 to be produced. The mold 20 comprises for example at least two parts movable relative to each other, between an opened position and a closed position. The two parts are for example hinged together and are movable in rotation relative to each other around an axis substantially parallel to the axis A of the preform 2. Each part of the mold 20 comprises a body comprising a hollow recess having the shape of a half bottle to be formed. According to a non-limiting example, the hollow recess of one part comprises a semi-cylindrical portion, closed at its lower end by a bottom surface having a the shape of a semi-circle, and terminated at its upper end by a tapered, then semi-cylindrical collar of a shape substantially complementary to the shape of half of the body 6 of the preform 2. The hollow recess of the other part of the mould is symmetrical to the hollow recess described above. In the opened position, the parts of the mould are separated from each other such that the preform 2 can be introduced between the two parts. In the closed position, the two parts are applied against each other to form a main part, such that the hollow recesses face each other and define together the molding cavity 20 having the shape of the container 1 to be formed. The mold 20 could comprise more than two parts. For example a third part having the shape of the bottom of the container could be provided to define the molding cavity 20 with two parts having the shape of the body of the container. The third part or the two bottom surfaces of the two parts of the mold define the bottom 22 of the mold 16.

The injection device 18 for injecting the pressurized incompressible liquid in the preform 2 will now be described. The injection device 18 described herein and shown in the figures is an example of an injection device that can be used for hydro forming methods and it is to be understood that the method according to the invention can be used with any other kind of injection devices.

The injection device 18 comprises an inlet 24, an outlet 26 and a chamber 28 extending between the inlet 24 and the outlet 26 and placing the inlet 24 in fluidic communication with the outlet 28.

The inlet 26 is placed in fluidic communication with an incompressible forming liquid source 30, for example a water reservoir, via injection means 32 adapted for transferring the liquid from the liquid source 30 to the inlet 24 at least one controllable predetermined pressure, and appropriate tubing extending between the inlet 24, the injection means 32 and the liquid source 30. According to the embodiment shown in FIG. 1, the injection means 32 are formed by a pump. Alternatively, the injection means can also be formed by a conventional piston or by other appropriate means allowing controlling the pressure of the liquid injected in the preform. According to an embodiment, the pressure applied by the injection means is variable such that the liquid can be injected at different pressures in the preform 2.

The outlet 26 is adapted to be placed in liquid tight fluidic communication with the opening 14 formed by the neck 12 of the preform 2 held by the mold 16 of the forming and filling station 4, and therefore with the inner volume of the preform 2. By liquid tight fluidic communication, it is meant that when the outlet 26 is in fluidic communication with the inner volume of the preform 2, the liquid flows only in the inner volume of the preform 2 and not outside the preform 2.

The outlet 26 is for example formed by an opening of an injection nozzle 34. The outlet 26 is in fluidic communication with the chamber 28. The injection nozzle 34 is movable inside a housing 36 of the injection device 18, in translation along axis A between a retracted position (FIG. 1) and an active position (FIGS. 2 to 6). In the retracted position, the injection nozzle 34 leaves room under the injection device 18 to position a preform 2 in the mold 16 or to retrieve a formed container 1 from the mold 16. In the active position, the injection nozzle 34 is placed against the neck 12 of the preform 2 with a liquid tight contact between the injection nozzle 34 and the neck 12 of the preform 2, such that the outlet 26 of the injection nozzle 34 is in fluidic communication with the inner volume of the preform 2. The chamber 28 of the injection nozzle 34 for example comprises a hollow space including a regular cylindrical portion and a truncated cone or a pyramidal portion extending between the regular cylindrical portion and the outlet 26 of the injection nozzle. The diameter of the chamber 28 reduces progressively from the diameter of the regular cylindrical portion to the diameter of the opening in the conical portion.

The housing 36 further comprises a first upper compartment 38 arranged to receive actuation means 40 for moving the injection nozzle 34. The actuation means are for example pneumatic actuation means and for example comprise a piston, attached to the injection nozzle 34 and hermetically separating the first upper compartment 38 into an upper part and into a lower part, each able to be filled with air. For moving the injection nozzle 34 between its retracted position and its active position, air is injected in the upper part of the first upper compartment 38 in order to increase the pressure in said upper part and to move the piston such that the volume of the upper part increases, while to volume of the lower part decreases. Conversely, for moving the injection nozzle 34 between its active position and its retracted position, air is injected in the lower part of the first upper compartment 38 in order to increase the pressure in said lower part and to move the piston such that the volume of the lower part increases, while to volume of the upper part decreases. The inner volume of the chamber 28 is hermetically isolated from the first upper compartment 38 by appropriate sealing means.

The injection device 24 further comprises a hollow control rod 42 extending in the chamber 28 along axis A. The hollow control rod 42 comprises at its lower end, extending in the chamber 28, a sealing ring 44. The sealing ring 44 has a shape which is complementary to the shape of part of the conical portion of the injection nozzle 34, such that, when the sealing ring 44 is applied against the wall of the conical portion, the sealing ring 44 closes hermetically the chamber 28 and prevents liquid from flowing through the outlet 26. The hollow control rod 42 is movable in translation along axis A in the chamber 28 between an injecting position, shown in FIGS. 3 to 5, wherein the sealing ring 44 is spaced from the wall of the conical portion of the injection nozzle and wherein the outlet 26 is in fluidic communication with the inlet 24 via the chamber 28, and a sealing position, shown in FIGS. 2 and 6, wherein the sealing ring 44 is applied against the wall of the conical portion of the injection nozzle 34 and hermetically closes the chamber 28.

The housing 36 further comprises a second upper compartment 46 arranged to receive actuation means 48 for moving the control rod 42. The actuation means are for example pneumatic actuation means and for example comprise a piston, attached to the control rod 42 and hermetically separating the second upper compartment 46 into an upper part and into a lower part, each able to be filled with air. For moving the control rod 42 between its injecting position and its sealing position, air is injected in the upper part of the second upper compartment 46 in order to increase the pressure in said upper part and to move the piston such that the volume of the upper part increases, while to volume of the lower part decreases. Conversely, for moving the control rod 42 between its sealing position and its injecting position, air is injected in the lower part of the second upper compartment 46 in order to increase the pressure in said lower part and to move the piston such that the volume of the lower part increases, while to volume of the upper part decreases. The first upper compartment 38 is hermetically isolated from the second upper compartment 46 by appropriate sealing means.

According to the embodiment shown in the figures, a stretch rod 50 extends inside the hollow control rod 42, passes through the outlet 26 and extends in the preform 2 to assist in the axial deformation of the preform 2 into a container, as known per se. The stretch rod 50 is movable in translation along axis A in the hollow control rod 42 and is actuated by appropriate actuation means 52, for example a servo motor or a magnetic actuation means.

Figure 6:
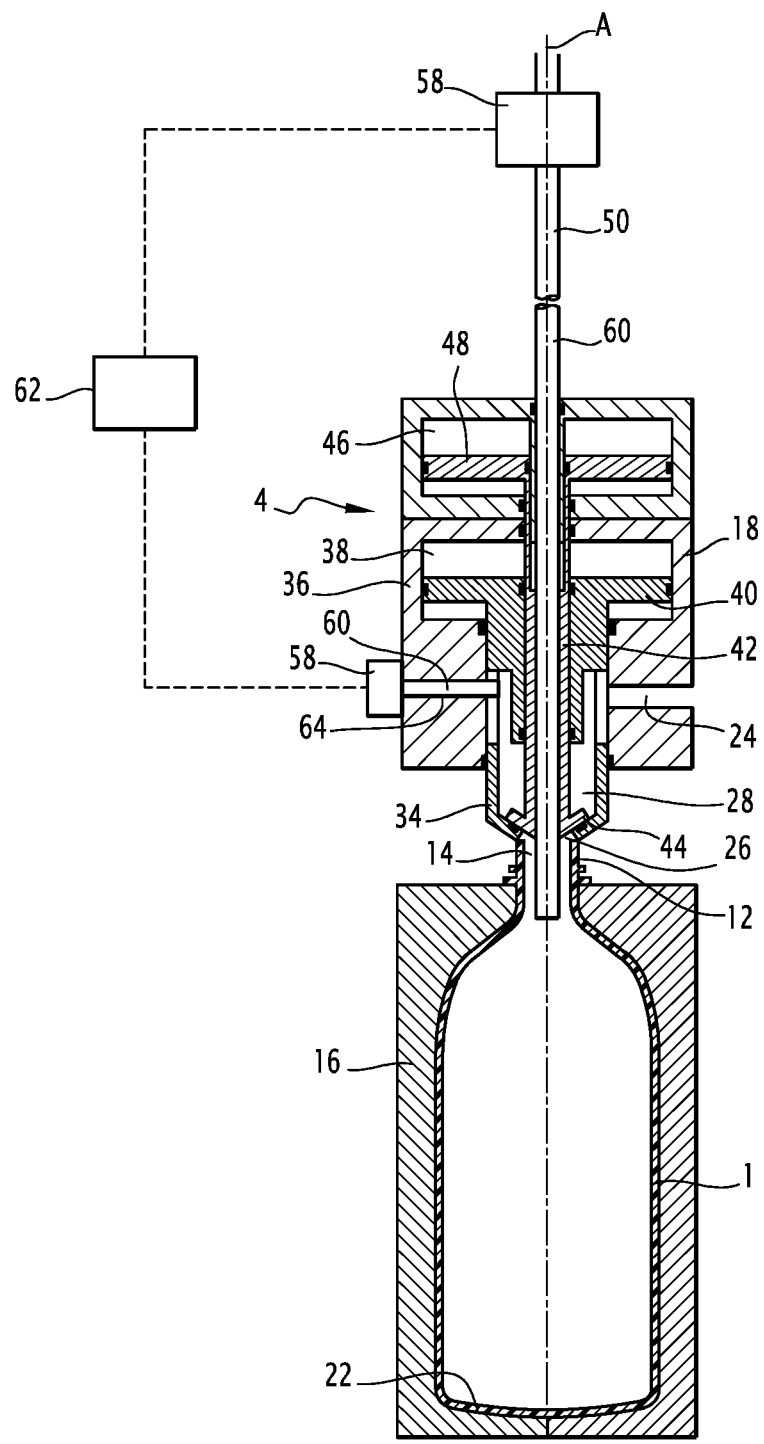

The seal ring 44 forms a rigid sealing barrier extending between the injection means 32 and the outlet 26 when the hollow control rod 42 is in the closed position. The rigid sealing barrier comprises a port 54 formed by the opening extending through the hollow control rod in the vicinity of the seal ring 44. The stretch rod 50 is movable in a fluid tight manner through the port thanks to appropriate sealing means extending between the hollow control rod 42 and the stretch rod 50. When the injection nozzle 34 is in the active position and the hollow control rod 42 is in the closed position, the rigid sealing barrier and the stretch rod 50 therefore delimit a fluid tight closed volume comprising the outlet 26 and the inner volume of the preform, the stretch rod 50 being able to be displaced in said closed volume in a fluid tight manner, as shown in FIGS. 2 and 6.

In the following description, the volume in which the liquid circulates in the injection device 18 is referred to as the liquid injection circuit 56 and the parts delimiting this volume define the wall of the liquid injection circuit 56, said wall of the liquid injection circuit being in contact with the liquid when the injection device 18 is full of liquid and/or is injecting liquid through the outlet. The liquid injection circuit is consequently delimited by the inlet 24, the chamber 28, the hollow control rod 42 and the outlet 26 and the wall of the liquid injection circuit is defined by a part of the inner wall of the housing 36, the inner wall of the injection nozzle 34 and the outer wall of the hollow control rod 42.

The injection device 18 of the forming station 4 according to the invention further comprises at least one vibratory device 58 arranged to emit vibrations which are to be transmitted to the inner wall 15 of the preform 2, as will be described subsequently. Such a vibratory device 58 is for example formed by a piezoelectric actuator mechanically coupled and/or attached to a vibrating part 60, the piezoelectric actuator being arranged to make the vibrating part 60 vibrate when said piezoelectric actuator is actuated. Such a piezoelectric actuator is known. The vibratory device is controlled by a control device 62 allowing to set the frequency and the amplitude of the vibrations of the vibrating part 60 such that the frequency and/or the amplitude of the vibrations are tuneable. Advantageously, the control device 62 also forms or is connected to the control device(s) of the injection means 32 and of the actuation means 40, 48, 52 of the injection nozzle 34, of the control rod 42 and of the stretch rod 50 and such that the movements of these parts and the triggering of the vibrations can be synchronized as will be described below.

The vibratory device 58 therefore forms an exciter and the preform forms a resonator forming an oscillating system to which energy is brought by the vibratory device 58.

According to a first embodiment of the forming station 4, the vibrating part 60 extends in the liquid injection circuit 56 such that the vibrations of the vibrating part 60 are transmitted to the liquid flowing in the liquid injection circuit 56. As shown in the figures, the vibrating part 60 is for example formed by a rod passing in a fluid tight manner through a port 64 provided in the housing 36 and protruding inside the chamber 28. According to an embodiment, the vibrating part 60 can be isolated from the housing 36 in such a way that the vibration of the vibrating part 60 does not cause a vibration of the whole housing 36.

According to a variant, the vibrating part 60 can be formed by one of the part delimiting the liquid injection circuit 56 such that a part of the wall of the liquid injection circuit 56 is vibrated. This can be obtained for example by mechanically coupling the piezoelectric actuator to the injection nozzle 34 or to the hollow control rod 42 or to a part of the housing 36 facing the liquid injection circuit 56.

According to a second embodiment of the forming station 4, the vibrating part 60 is formed by the stretch rod 50, meaning that the piezoelectric actuator is arranged to vibrate the stretch rod 50. This is obtained by mechanically coupling and/or attaching the piezoelectric actuator to the stretch rod 50.

According to a third embodiment shown in the figures, the forming station 4 comprises at least two vibratory devices 58, one having its vibratory part 60 extending in the liquid injection circuit 56 and the other having its vibratory part 60 formed by the stretch rod 50, which increases the vibratory energy brought by the vibratory devices. Furthermore, using two vibratory devices 58 can be advantageous in terms of space requirements since the size of each vibratory device can be reduced while producing the same energy as a single bigger vibratory device. Furthermore, with two vibratory devices, the shape of the waves of the vibrations can be better controlled for example by making the vibratory devices 58 vibrate in phase or in phase opposition.

The method for forming and filling a container 1 using the forming station 4 described above will now be described.

A heated preform in a malleable state 2 is first placed in the mold 22 while the injection nozzle 34 is in the retracted position and the control rod 42 is in the closed position, as shown in FIG. 1.

The chamber 28 is filled with liquid from the liquid source 30 via the injection means 32 and the injection nozzle 34 moves in the active position to place the outlet 26 in fluidic communication with the neck 12 of the preform 2 while the control rod 42 remains in the closed position, as shown in FIG. 2.

The forming step of the method during which the preform 2 is shaped into a container then starts.

If the forming and filling station 4 comprises a stretch rod 50, the forming step then comprises a stretching phase, wherein the stretch rod 50 is actuated such as to move according to the longitudinal axis A until the stretch rod 50 contacts the inner wall of the closed extreme part 10, or bottom, of the preform 2, as shown in FIG. 2.

Figure 3:
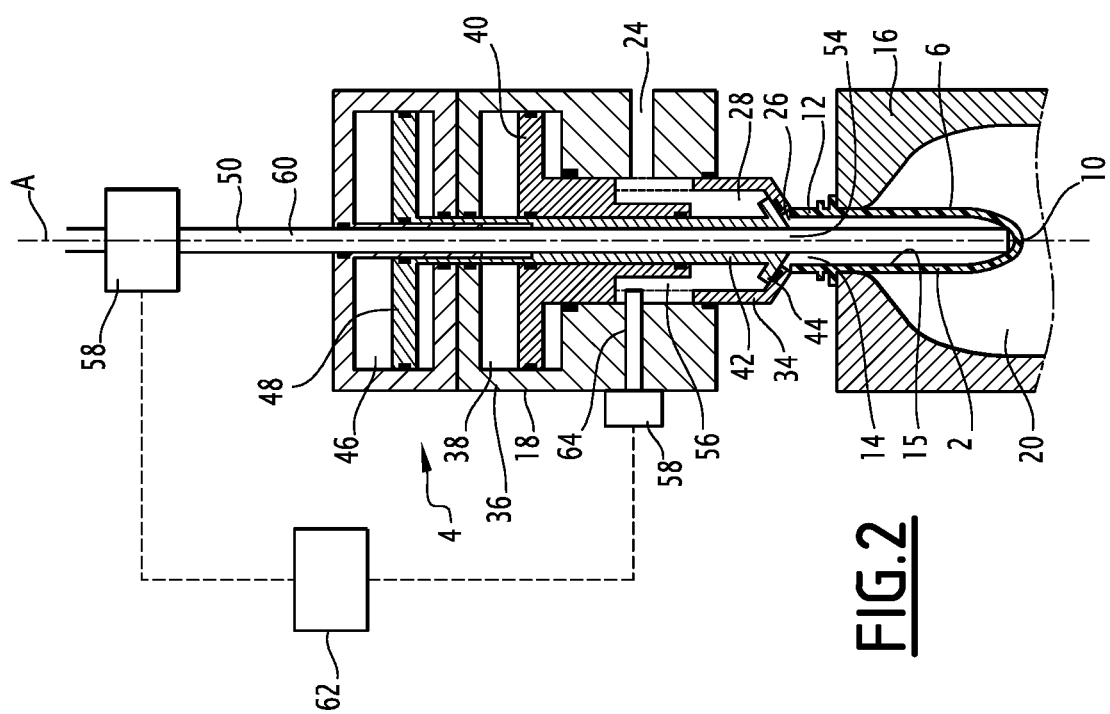
Figure 4:
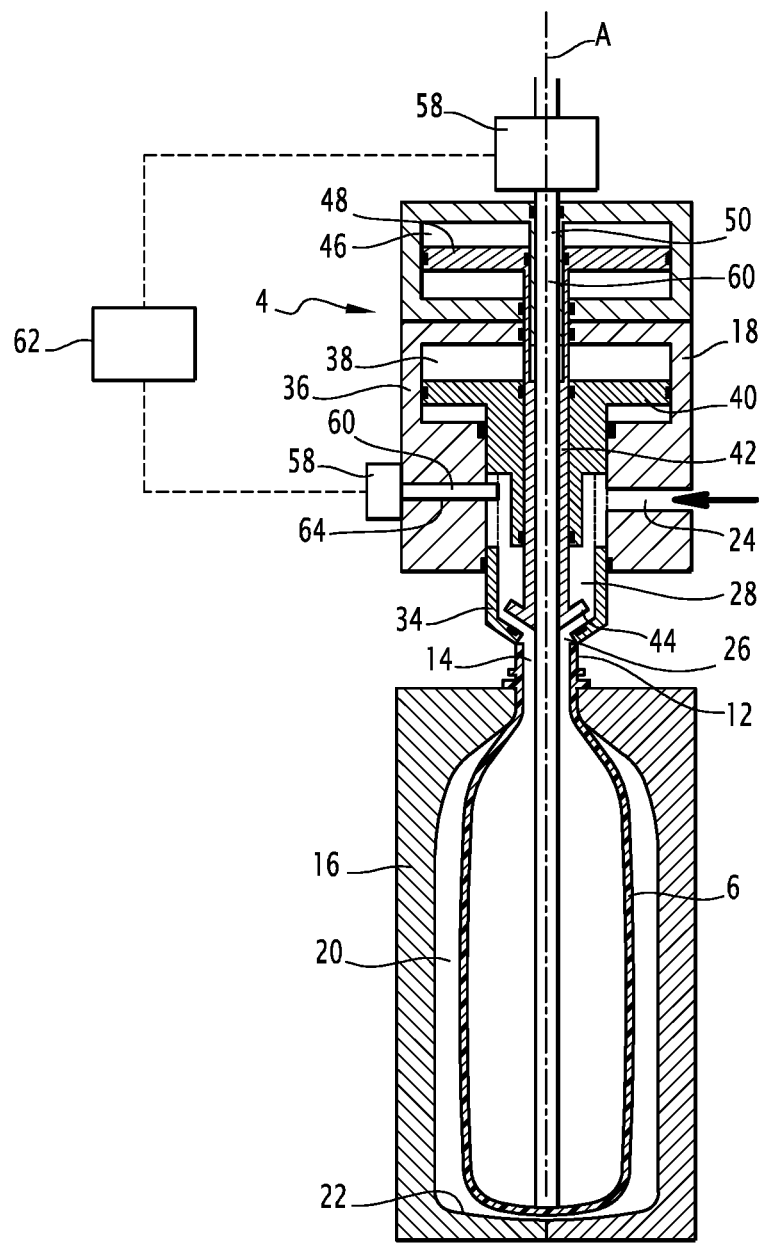

The stretch rod 50 is than further actuated towards the bottom 22 of the mold 16 such that the preform 2 is stretched in the axial direction until the closed extreme part 10 of the preform 2 contacts the bottom 22 of the mold 16, as shown in FIGS. 3 and 4. The stretch rod 50 therefore assists in the axial expansion of the preform 2. The stretch phase is defined as the phase during which the stretch rod 50 applies a force in the axial direction on the closed extreme part 10 of the preform 2. The stretch phase ends when the closed extreme part 10 reaches the bottom 22 of the mold 16. The stretch rod 50 is than retracted as shown in FIG. 5

According the second and third embodiment, the vibratory device 58 can be used during at least a part of the stretching phase described above. This means that during a part of the stretching phase, the vibratory part 60 formed by the stretch rod 50 is vibrated, the vibrations being transmitted to the tip of the stretch rod 50 in contact with the inner wall of the closed extreme part 10 of the preform 2. Consequently, the vibrations of the stretch rod 50 are transmitted to the wall of the preform 2 and are converted in thermal energy in the wall of the preform 2. Indeed, the vibrations transmitted to the wall of the preform 2 are arranged to resonate with the internal molecule chains of the material of the preform such that said molecule chains are agitated, thereby creating internal frictions in the wall of the preform; which generates a heating of the wall of the preform. The frequency and the amplitude of the vibrations generated by the vibratory device 58 are therefore arranged such that said vibrations resonate with the internal molecule chains of the material of the preform. According to an example, the frequency of the vibrations is in the ultrasound range. In order to optimize the resonance with the internal molecule chains, the frequency of the vibrations is preferably close or equal to one of the natural vibration frequency of the wall of the wall of the preform 2.

The vibrating of the closed extreme part 10 of the preform 2 for example starts when the liquid starts to enter the preform 2 as will be described subsequently and stops when the closed extreme part 10 of the preform 2 comes into contact with the bottom 22 of the mold 16.

Figure 5:
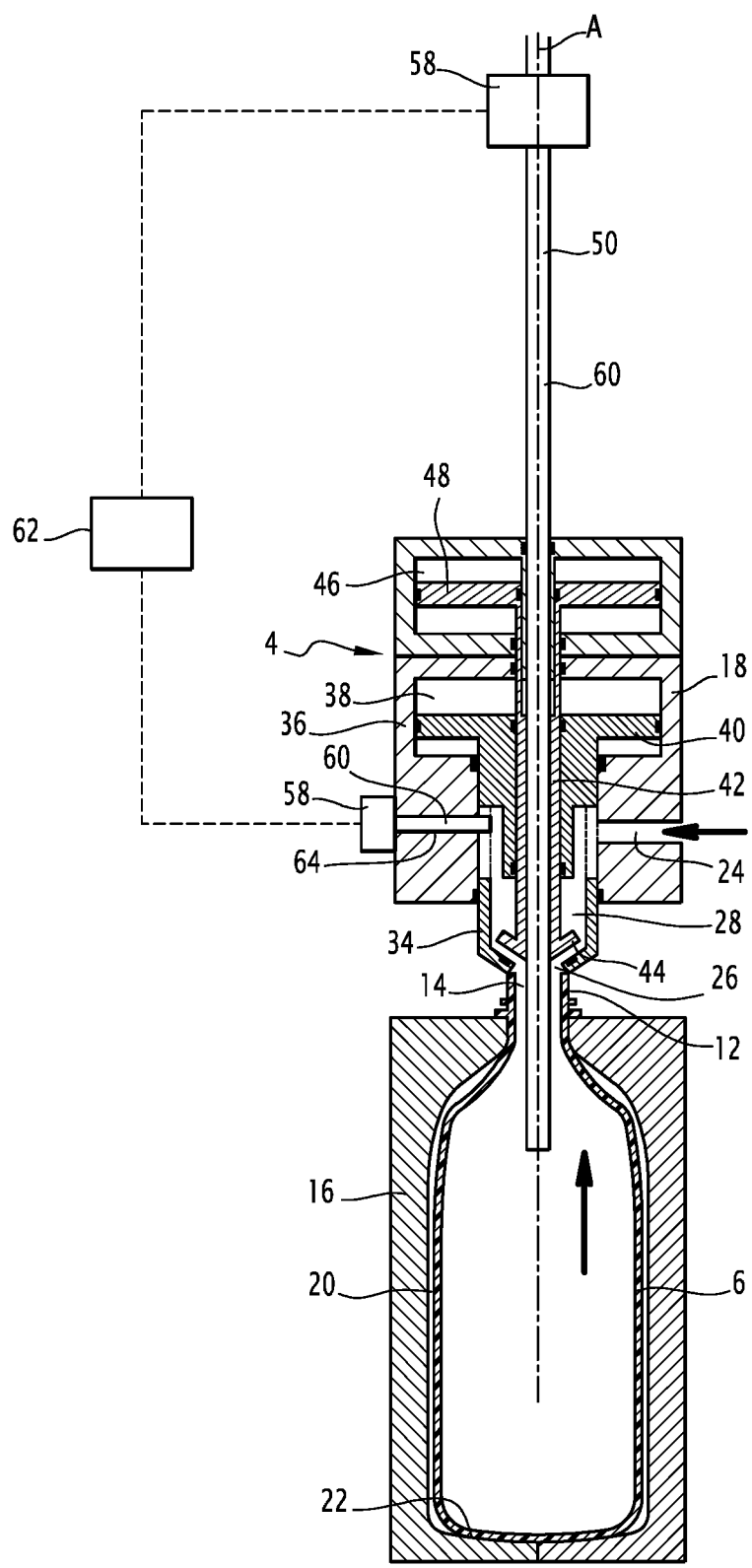

The forming step comprises an injection step, wherein liquid is injected in the preform 2 through the outlet 26 of the injection device 18 such that the liquid expands the preform 2 up to the shape of the molding cavity 20, as shown in FIGS. 3 to 5.

The injection step starts with the displacement of the control rod 42 to its open position, as shown in FIG. 3, thereby placing the outlet 18 in fluidic communication with the chamber 28. The liquid in the chamber 28 is therefore injected in the preform 2 through the inner opening 14 of the neck 12. The liquid is injected at a first pressure $P_1$ imparted on the liquid by the injection means 32. The first pressure $P_1$ is for example comprised between 4 and 15 bars depending on the size and volume of the container to be produced. If a stretching phase occurs, the injection step can start during said stretching phase as shown in FIGS. 3 and 4.

According to an embodiment, the liquid is injected at the first pressure until the completion of the container 1, meaning the injection step takes place at a single pressure $P_1$.

According to another preferred embodiment, the injection at the first pressure is a low pressure injection phase and is followed by a high pressure injection phase wherein the pressure in the container is increased up to a second pressure $P_2$, greater than the first pressure $P_1$, to create a pressure peak in the container and complete the forming of the container. Indeed, it is known that the first pressure level might not sufficient to completely shape the preform into the container, meaning that, with the pressure applied to the preform, the preform acquires a shape which is not exactly the shape of the molding cavity and that an extra deformation is needed to completely urge the wall of the preform against the wall of the molding cavity. Shapes having locally a very small radius of curvature are very difficult to obtain. Applying a pressure peak during a short time allows finalizing the container. Such a pressure peak guaranties a good imprint of the shape of the molding cavity 20 on the container, in particular when ridges or embossed letters or logos must be reproduced on the external surface of the container wall.

The first pressure $P_1$ is for example applied until the preform has acquired an intermediary shape 66, which is not quite the shape of the container to be produced, as shown in FIG. 5. The intermediary shape 66 presents a volume, which is substantially comprises between 90% and 98% of the volume of the container 1 to be produced, meaning that the deformed preform has to be further deformed such that the volume increases by 2% to 10% for the container to be obtained. This increase in volume is obtained by applying the second pressure $P_2$. The second pressure $P_2$ is for example comprised between 20 and 80 bar. When the preform material is PET, the second pressure $P_2$ can be comprised between 20 and 50 bar, in particular between 35 and 40 bar. The change in pressure is for example applied by changing the pressure of the liquid via the injection means 32 during the injection of the liquid in the deformed preform.

According to the first embodiment of the invention, the vibratory device 58 is used during at least a part of the injection step to vibrate the liquid circulating in the injection circuit 56 such that the vibrations are transmitted to the inner wall of the preform 2 by the liquid injected in the preform 2. Indeed, vibrating the liquid during the injection step helps to compensate the cooling of the inner wall of the preform 2 due to the temperature of the injected liquid by causing a heating of the inner wall of the preform thanks to the vibration, as described previously.

According to an embodiment, the vibratory device 58 having a vibratory part 60 extending in the liquid injection circuit 56 is actuated during at least a part of the low pressure injection phase, i.e. while the liquid is injected at the first pressure $P_1$.

According to another preferred embodiment, when a high pressure injection phase takes place, the vibratory device 58 having a vibratory part 60 extending in the liquid injection circuit 56 is actuated during at least a part of the high pressure injection phase, i.e. while the liquid is injected at the second pressure $P_2$. This embodiment is particularly advantageous because the vibrations are used to bring heating energy to the inner wall of the preform 2 at the end of the injection step, i.e. when the preform has been substantially cooled down by the liquid injected in the preform, i.e. when the heating energy is most needed. Furthermore, during the high pressure injection phase, the flow rate of the liquid injected in the preform is reduced, thereby reducing the appearance of cavitation inside the liquid in the preform, which improves the transmission of vibrations inside the liquid.

According to another embodiment, the liquid is vibrated during both the low pressure injection phase and the high pressure injection phase.

According to the third embodiment, the stretch rod 50 can be used to bring energy to the inner wall of the preform during the stretching phase while the other vibratory device 58 is used during the injection step, for example during the high pressure injection step. By bringing energy in a continuous manner to the inner wall of the preform, it is ensured that the preform remains in a malleable state during the complete forming step.

It should be noted that the stretch rod 50 can also be used to vibrate the liquid inside the preform 2 after the stretching phase. This is particularly advantageous if the second pressure $P_2$ is applied while the injection of liquid is stopped. This can be obtained by closing the sealing barrier formed by the seal ring 44 once the container has reached its intermediary shape and once the closed volume extending below the seal ring 44 is full of liquid and by moving the stretch rod 50 through the port 54 in said closed volume, such that the volume of the stretch rod 50 in the closed volume increases. Such an increase causes an increase in the pressure inside the closed volume. Said increase can be set such that the second pressure P2 is applied inside the container having its intermediary shape. In this case, the liquid in the chamber cannot be used to transmit vibrations to the wall of the container. Vibrating the stretch rod 50 in the liquid filling the closed volume can, in this case, bring energy to the inner wall of the preform 2 since the vibrations of the stretch rod 50 are transmitted to the inner wall of the preform 2 by the liquid in the closed volume.

As mentioned previously, the vibratory device(s) are controlled by the control device 62 in synchronisation with the other parts of the forming and filling station 4. If needed, the frequency and/or the amplitude of the vibrations emitted by the vibratory device(s) can be modified during the actuation of the vibratory device(s).

It should be noted that the vibrations of the inner wall of the preform will occur in parts of the preform that are not in contact with the wall of the molding cavity 22, the vibrations of the wall of the preform being absorbed in the parts that are in contact with the wall of the molding cavity 22. In other words, the vibrating of a part of the wall 15 of the preform 2 is stopped when said part of the wall 15 comes into contact with the wall of the mold 16 during the forming step. Such a phenomenon is satisfactory since only the parts not in contact with said molding cavity 22 require a deformation, the other parts of the container being finished since they comply with the shape of the molding cavity 22.

Consequently, the vibratory device(s) used during the forming step of the container allows forming filled containers which are satisfactory in terms of shape, of mechanical and/or thermal resistance and/or in terms of gas permeability.

The vibratory device(s) 58 can also be used during the cleaning of the injection device 18 described above, as will now be described in reference to FIG. 7.

Figure 7:
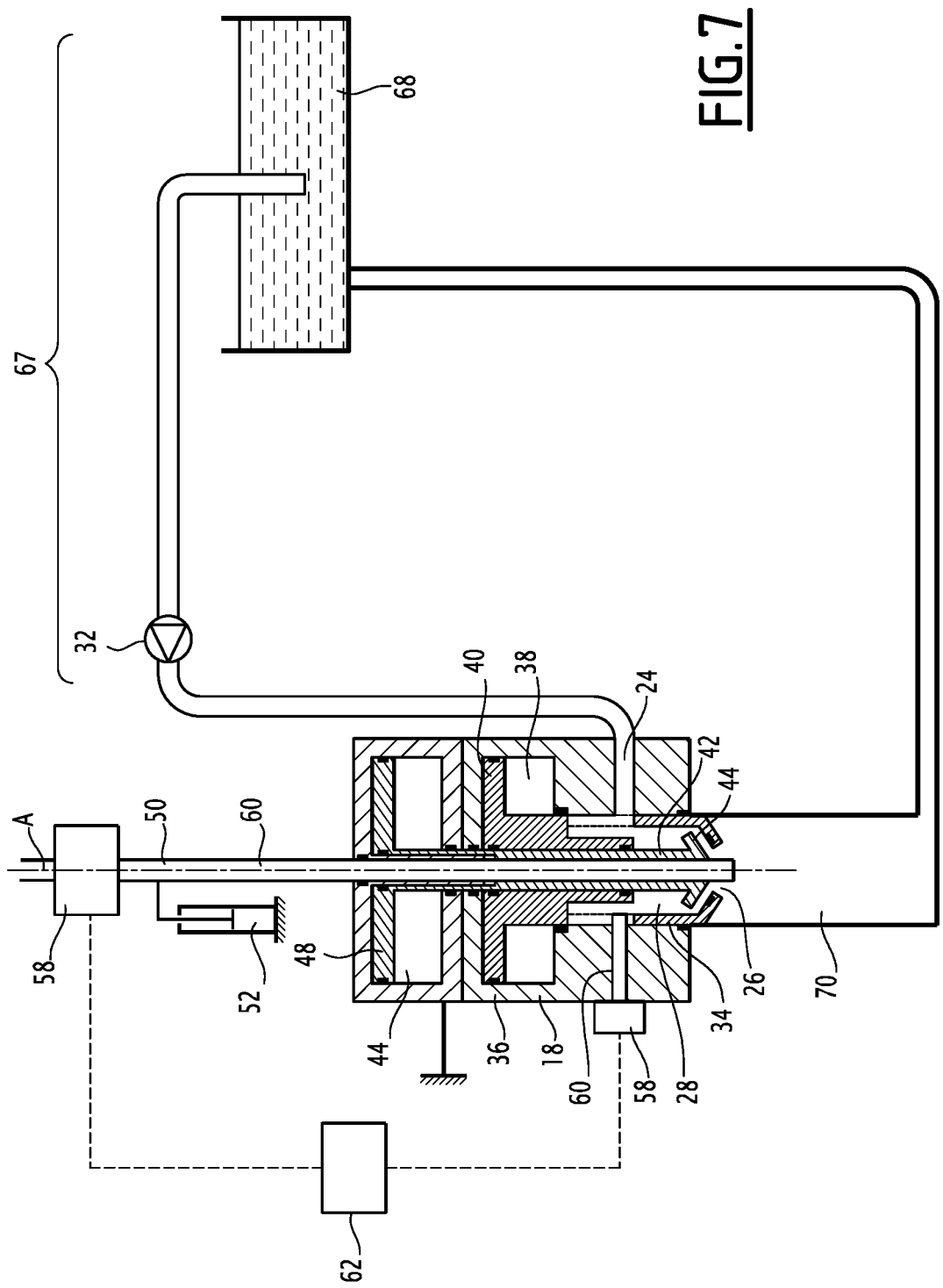
FIG. 7 is a diagrammatical cross-section view of part of an assembly comprising a forming station according to the invention during a cleaning step of said forming station.

For cleaning the injection device 18, the inlet 24 of the injection device is placed in fluidic communication with a source of cleaning liquid 68, via the injection means 32, and the outlet 26 of the injection device 18 is placed in fluidic communication with a cleaning liquid collecting container 70, as shown in FIG. 7.

The liquid collecting container 70 is for example formed by a "dummy container", for example connected to the source of cleaning liquid 68 in order to form a close circuit for circulating the cleaning liquid through the injection device 18.

The control rod 42 is placed in its opened position and the cleaning liquid is injected in the chamber 28 via the inlet 24 and the injection means 32. Consequently, the cleaning liquid flows through the chamber 28, exit the injection device 18 through the outlet 26 and flow inside the dummy container 70, thereby cleaning the liquid injection circuit 56.

By actuating the vibratory device 58 having a vibrating part 60 extending the liquid injection circuit 56, it is possible to assist in the cleaning of the injection device 18 since the vibrations can help detaching adhering parts, for example tacky elements from the forming and filling liquid used to form and fill containers 1, from the wall of the liquid injection circuit 56. The vibratory device 58 having the stretch rod 50 as the vibrating part 60 can also be used to vibrate the cleaning liquid.

The invention claimed is:

1. A method for forming a container from a preform and filling the container with a liquid using an injection device having an outlet through which the liquid is injected into the preform, the method comprising the steps of:
   placing a preform in a malleable state in fluidic communication with the outlet of the injection device,
   forming the container by expanding the preform, the forming of the container including at least an injection step where pressurized liquid is injected into the preform through the outlet of the injection device such that the liquid expands the preform into a container and fills the container,
   heating a wall of the preform during at least a part of the forming step by vibrating the wall of the preform during the at least part of the forming step.

2. The method according to claim 1, wherein the step of heating the wall of the preform during at least a part of the forming step includes resonating vibrations with the internal molecular chains of the material of the preform.

3. The method according to claim 1, wherein the wall of the preform is vibrated during at least a part of the injection step.

4. The method according to claim 3, wherein the liquid flows from a source of pressurized liquid to the outlet of the injection device via a liquid injection circuit, vibrating the liquid flowing in the injection circuit such that vibrations of the liquid flowing in the liquid injection circuit are transmitted through the outlet and into the preform during the injection step and to the wall of the preform by the liquid.

5. The method according to claim 1, wherein the injection step comprises a low pressure injection phase wherein liquid is injected inside the preform at a first pressure until the preform acquires an intermediary shape, the injection step also comprising a high pressure injection phase occurring after the low pressure injection phase wherein liquid is injected inside the preform having the intermediary shape at a second pressure until the preform acquires the final shape of the container to be formed, the second pressure being greater than the first pressure.

6. The method according to claim 5, wherein the vibrating of the wall of the preform is conducted during at least a part of the low pressure injection phase.

7. The method according to claim 5, wherein the vibrating of the wall of the preform is conducted during at least a part of the high pressure injection phase.

8. The method according to claim 5, wherein the low pressure injection phase occurs until the intermediary shape has a volume corresponding to between 90% and 98% of the volume of the container to be shaped, and wherein the high pressure injection phase occurs such that the volume of the intermediary shape further increases by 2% to 10% of the volume of the container to be shaped in order to obtain the final shape of the container.

9. The method according to claim 1, wherein the forming of the container includes a stretching phase wherein a stretch rod of the injection device is moved to expand the preform by exerting a force in an axial direction on a bottom of the preform, the wall of the preform being vibrated during at least a part of the stretching phase.

10. The method according to claim 9, wherein the wall of the preform is vibrated by vibrating the stretch rod such that the vibrations of the stretch rod are transmitted to the wall of the preform during the stretching phase.

11. The method according to claim 1, wherein the preform is placed in a mold defining a molding cavity having a shape of the container to be formed, the mold being arranged to receive the preform such that the preform acquires the shape of the molding cavity when the forming fluid is injected into the preform, and stopping vibrating of a part of the wall of the preform when the part of the wall of the preform contacts the wall of the mold during the forming step.

12. The method according to claim 1, wherein at least one of vibration frequency and vibration amplitude of the wall of the preform is tunable such that the wall of the preform can be vibrated at different vibration frequencies or at different vibration amplitudes during at least a part of the forming step.

13. A forming station for forming a container from a preform by injecting a liquid into the preform to expand the preform into a container and by heating a wall of the preform by vibrating the wall of the preform during at least part of forming of the container, the forming station comprising:
    a source of pressurized liquid,
    a injection device having an inlet in fluidic communication with the source of pressurized liquid and an outlet in fluidic communication with the inlet, the injection device configured to inject the pressurized liquid into the preform through the injection device during an injection step,
    at least one vibratory device configured to emit vibrations and transmit the vibrations to a wall of the preform, and
    a control device configured to actuate the vibratory device during at least a part of forming of the container, the vibrations being configured to heat the wall of the preform when the vibratory device is actuated.

14. The forming station according to claim 13, wherein the vibrations vibrating the wall of the preform during at least a part of the forming of the container are arranged to resonate with internal molecular chains of material of the preform.

15. The forming station according to claim 13, further comprising a liquid injection circuit extending between the source of pressurized liquid and the outlet, the vibratory device being connected to the liquid injection circuit, the vibratory device comprising a vibrating part extending in the liquid injection circuit such that the vibrating part is in contact with the liquid during injection of the liquid into the preform, the control device being configured to actuate the vibratory device during at least a part of the injection of the liquid into the preform.

16. The forming station according to claim 13, further comprising a stretch rod movable in translation relative to the outlet along an axis of the stretch rod, the stretch rod configured to cause axial deformation of the preform during a stretching phase, the vibratory device being mechanically coupled to the stretch rod and the control device being configured to actuate the vibratory device during at least a part of the stretching phase.

17. The forming station according to claim 13 in an assembly further comprising:
    a source of pressurized cleaning liquid, and
    a cleaning liquid collecting container placed in fluidic communication with the outlet of the injection device of the forming station,
    wherein the control device is further configured to actuate the vibratory device during at least a part of a cleaning step in which the cleaning liquid circulates in the injection device from the source of pressurized cleaning liquid to the cleaning liquid collecting container.

18. The method according to claim 5, wherein the vibrating of the wall of the preform is conducted during at least a part of the low pressure injection phase and during at least a part of the high pressure injection phase.

\* \* \* \* \*